Patented Sept. 9, 1941

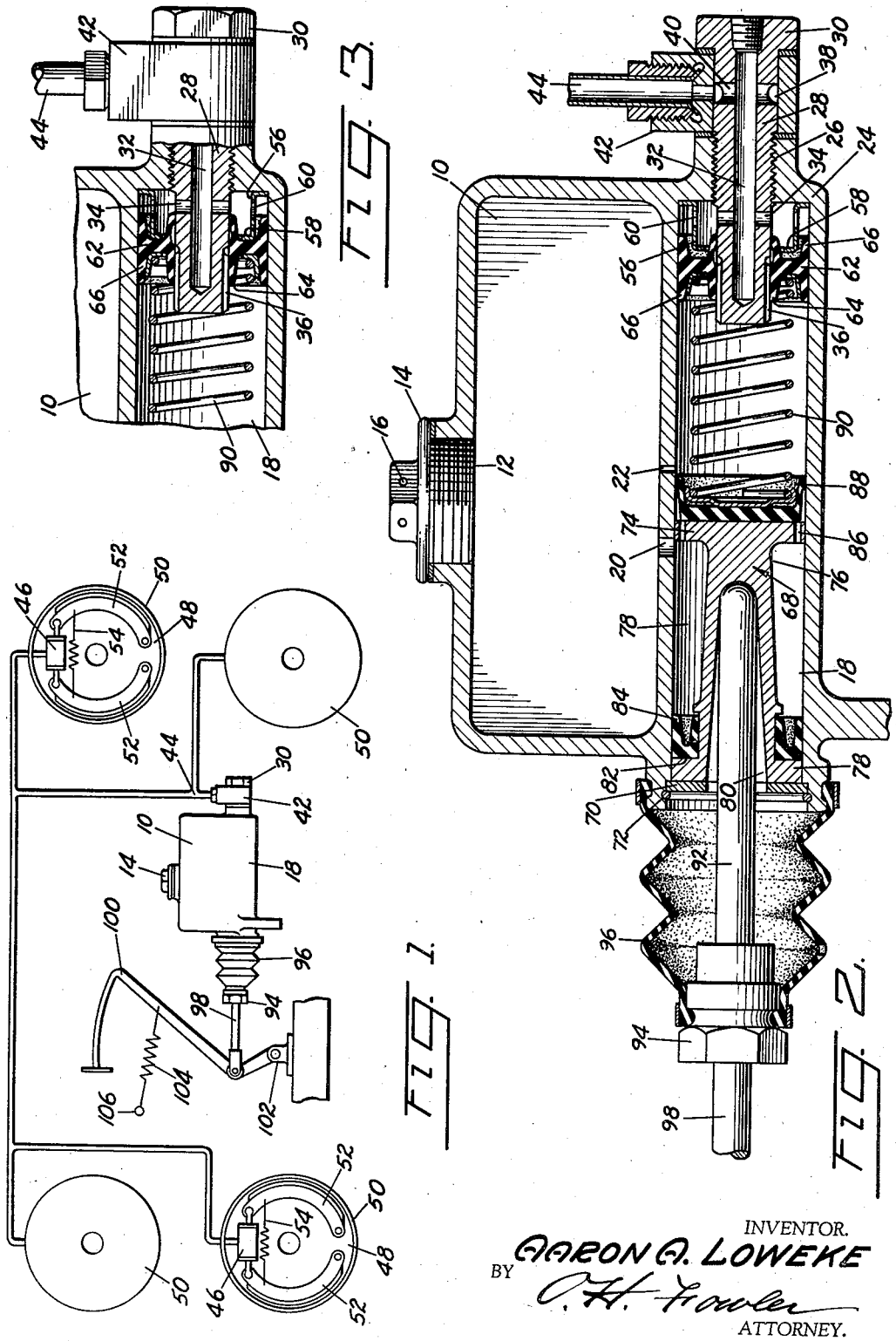

2,255,259

UNITED STATES PATENT OFFICE 2,255,259

FLUID PRESSURE BRAKING SYSTEM

Aaron A. Loweke, Detroit, Mich., assignor to Hydraulic Brake Company, Detroit, Mich., a corporation of California Application May 20, 1939, Serial No. 274,821

4 Claims. (Cl. 60—54.6)

This invention relates to fluid pressure braking systems, and more particularly to fluid pressure producing devices for such systems.

An object of the invention is to provide a fluid pressure producing device operative to continuously retain a positive pressure on the fluid in the system.

Another object of the invention is to provide a fluid pressure producing device operative to continuously retain a predetermined pressure on the fluid in the system when the device is at rest and to compensate for expansion and contraction of the fluid due to temperature changes.

Other objects of the invention will appear from the following description taken in connection with the drawing forming a part of this specification, and in which—

Fig. 1 is a schematic view of a fluid pressure braking system embodying the invention.

Fig. 2 is a longitudinal sectional view of the fluid pressure producing device; and Fig. 3 is a fragmentary view of the fluid pressure producing device on compression stroke.

Referring to the drawing for more specific details of the invention, 10 represents a fluid reservoir having a filling opening 12 normally closed by a plug 14 having openings 16 therethrough for venting the reservoir to the atmosphere.

A cylinder 18 at the base of the reservoir has spaced ports 20 and 22 providing communications between the cylinder and the reservoir. One end of the cylinder is open, and its other end is closed as by a head 24 having an axial bore 26.

A fitting 28 threaded in the axial bore 26 has one end extended well into the cylinder and its other end extended beyond the head of the cylinder and provided with a head 30. The fitting has an axial bore 32, and that end of the fitting extended into the cylinder has a diametral bore 34 communicating with the bore 32 and also a plurality of spaced longitudinal channels 36, the purpose of which will hereinafter appear. The outer end of the fitting has a circumferential groove or channel 38 and a diametral bore 40 providing communication between the groove 38 and the axial bore 32, and a T fitting 42 for attaching a fluid pressure delivery pipe is sleeved on the outer end of the fitting 28 in communication with the groove 38 and secured between the head 24 of the cylinder and the head 30 of the fitting 28.

A fluid delivery pressure delivery pipe or conduit 44 suitably connected to the T fitting 42 has branches connected respectively to fluid pressure actuated motors 46, preferably arranged in pairs, one pair for actuating the brakes associated with the front wheels of the vehicle and another pair associated with the rear wheels of the vehicle.

The brakes may be of any preferred structure. As shown, each of the brakes includes a fixed support or backing plate 48, a rotatable drum 50 associated with the backing plate, a pair of corresponding interchangeable friction elements or shoes 52 pivotally mounted on the backing plate for cooperation with the drum, a retractile spring 54 connecting the shoes, and a motor corresponding to the motors 46 mounted on the backing plate and connected to the shoes for actuating the shoes into engagement with the drum against the resistance of the retractile spring.

A sleeve 56 fitted tightly in the cylinder 18, preferably a press fit, is seated on the back of the head 24 of the cylinder and extends therefrom concentrically of the cylinder and the fitting 28. The sleeve has an inturned flange 58 and a plurality of spaced openings 60.

A piston 62 of rubber or other flexible material reciprocable in the cylinder has a concentric opening for the reception of the fitting 28 and inner and outer marginal flanges 64 and 66, the former embracing the fitting 28, and the latter engaging the wall of the cylinder.

A piston 68 reciprocable in the cylinder 18 is held against displacement by a washer 70 seated on an annular shoulder in the open end of the cylinder and secured in place by a retaining ring 72 seated in a groove in the wall of the cylinder.

The piston 68 includes a head 74, a reduced body portion 76 providing in conjunction with the wall of the cylinder an annular chamber 78 communicating with the reservoir 10 by way of the port 20, and a skirt 78 having a concentric recess or socket 80 extended well into the body of the piston and a shoulder 82 providing a seat for a sealing cup 84 for inhibiting seepage of fluid from the cylinder past the piston.

The head 74 of the piston has a plurality of spaced passages 86 therethrough providing communications between the annular chamber 78 and that portion of the cylinder 18 forward of the piston. A sealing cup 88 seated on the head 74 controls the passages 86, and a spring 90 interposed between the cup and the piston 62 with suitable spring seats interposed serves to retain the cup against displacement and also to impose a predetermined load on the piston 62.

A thrust pin 92 has one of its ends seated in the socket 80 of the piston 68, and a coupling 94 fitted on its other end is connected by a flexible boot 96 to the open end of the cylinder for the exclusion of dust and other foreign substances from the cylinder. A rod 98 connects the coupling 94 to a foot pedal lever 100 pivotally mounted on a bracket 102 and connected by a retractile spring 104 to a fixed support 106.

In a normal operation, upon depressing the foot pedal lever 100, force is transmitted therefrom through the rod 98 and thrust pin 92 to the piston 68, resulting in movement of the piston on its compression stroke. During the initial movement of the piston on its compression stroke, the cup 88 covers the port 22, and, thereafter, as the piston proceeds on its compression stroke, fluid in the cylinder forward of the piston 68 is displaced therefrom through the channels 36 in the fitting 28 past the piston 62, through the openings 34 in the fitting 28, thence through the axial bore 32 and fluid pressure delivery pipe or conduit 44 and its respective branches into the fluid pressure actuated motors 46, causing energization of the motors and the consequent actuation of the shoes 52 into engagement with the drum 50 against the resistance of the retractile springs 54 to effectively retard rotation of the drum.

Upon completion of a braking operation, the foot pedal lever 100 is released and returns to its retracted position under the influence of the retractile spring 104. This results in releasing the piston 68 and return of the piston to its retracted position under the influence of the spring 90. As the piston 68 returns to its retracted position, a partial vacuum is created in the cylinder 18 forward of the piston. This results in drawing fluid from the reservoir 10 through the port 20 into the annular chamber 78, thence through the passages 86 in the head of the piston past the sealing cup 88 into that portion of the cylinder forward of the piston, so as to completely fill the cylinder. Simultaneously with this operation, fluid is returning to the cylinder from the motors 46 and fluid pressure delivery pipe 44 and its respective branches under the influence of the retractile springs 54 connecting the shoes 52 of the brakes.

During this operation the piston 62 recedes, due to the pressure on the fluid in the fluid pressure delivery pipe 44, its branches and the motors connected thereto, until the flange 64 on the piston 62 opens the channels 36 so as to establish communication between that portion of the cylinder forward of the piston 68 and the fluid pressure delivery pipe 44. When the pressure on the fluid in the pressure delivery pipe 44, its branches and the motors 46, drops to a predetermined pressure depending upon the load on the spring 90, the piston 62 is advanced by the spring 90 to close the channels 36 so as to maintain a constant pressure on the fluid in the fluid pressure delivery pipe 44, its branches, and the motors connected to the branches. It is, of course, understood that the spring 90 may yield, due to expansion of the fluid in the system so as to relieve the pressure on the fluid. It is also to be understood that the fluid returned to the cylinder may be in excess of the quantity necessary to completely fill the cylinder, and in that event the excess fluid is displaced therefrom through the port 22 into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder open at one end and closed at its other end by a head having an opening therethrough, a piston reciprocable in the cylinder, a member mounted in the opening and extended into the cylinder having a passage therethrough and peripheral longitudinal channels, a floating piston reciprocable on the member having a yieldable part cooperating with the channels for control of fluid flow through the passage in both directions, means for limiting movement of the floating piston in one direction, and a compression member between the pistons.

2. A fluid pressure producing device comprising a cylinder open at one end and closed at its other end by a head having an axial opening, a piston reciprocable in the cylinder, a member mounted in the axial opening and extended into the cylinder having a passage therethrough and peripheral longitudinal slots, a floating piston reciprocable on the member having a yieldable part embracing the extension and another part engaging the wall of the cylinder the part embracing the extension cooperating with the slots for control of fluid flow through the passage in both directions, a stop for limiting forward movement of the floating piston, and a compression spring between the pistons.

3. A fluid pressure producing device comprising a cylinder open at one end and closed at its other end by a head having an axial opening, a piston reciprocable in the cylinder, a member mounted in the axial opening and extended into the cylinder having a passage therethrough and spaced peripheral longitudinal channels, a floating piston reciprocable on the member having an inner perimetral yieldable flange embracing the member and cooperating with the channels for control of fluid flow through the passage in both directions, and a marginal flange engaging the wall of the cylinder, a stop on the head of the cylinder for limiting forward movement of the floating piston, and a compression spring between the pistons.

4. A fluid pressure producing system comprising a reservoir, a cylinder supplied therefrom open at one end and closed at its other end by a head having an axial opening, a piston reciprocable in the open end of the cylinder, a member mounted in the axial opening and extended into the cylinder having a passage therethrough and spaced peripheral longitudinal channels, a floating piston reciprocable on the member having an inner perimetral yieldable flange embracing the member and cooperating with the channels for control of fluid flow through the passage in both directions and a marginal flange engaging the wall of the cylinder, a stop on the head of the cylinder for limiting forward movement of the floating piston, a spring interposed between the piston and the floating piston adapted to return the piston to its retracted position and to resist retraction of the floating piston, and a fluid pressure actuated motor connected to the passage in the member adapted to be actuated upon advance of the piston and to actuate the floating piston on its retraction stroke against the resistance of the spring.

AARON A. LOWEKE.